Oct. 25, 1960  V. LANGEN  2,957,714
BALL JOINT PARTICULARLY FOR STEERING
ELEMENTS OF MOTOR VEHICLES
Filed Sept. 5, 1957

INVENTOR.
Victor Langen
BY
Patent Agent

United States Patent Office 2,957,714
Patented Oct. 25, 1960

2,957,714

BALL JOINT PARTICULARLY FOR STEERING ELEMENTS OF MOTOR VEHICLES

Victor Langen, Meererbusch, near Dusseldorf, Germany, assignor to A. Ehrenreich & Cie., Dusseldorf-Oberkassel, Germany Filed Sept. 5, 1957, Ser. No. 682,154

Claims priority, application Germany Sept. 11, 1956

6 Claims. (Cl. 287—90)

The present invention relates to a ball joint, particularly for use in connection with steering elements of motor vehicles. It is known to provide a ball socket with an extension in order to obtain a joint cup which may be inserted into the eye of the steering link system. It is furthermore known to form the joint cup by a ball cup and a cover cap and to hold together the interconnected flanges thereof by means of a ring.

It is an object of the present invention to provide an improved and simplified ball joint of the above-mentioned type.

It is another object of this invention to provide a ball joint of the type set forth above which is composed of parts which can easily be produced and interconnected and installed.

These and other objects and advantages of the invention will appear more clearly from the following specification in connection with the accompanying drawings in which:

Fig. 4 is a modification with the ball head-stud construction inversed with regard to the arrangement of Figs. 1 and 1a.

According to the present invention, the cover cap and a ball cup are interconnected by means of teeth respectively forming a part thereof so as to compose the joint cup which is held in the joint socket by means of a ring or the like. Such a joint can be built up and installed in a very simple manner, while the said teeth will prevent a relative rotative movement between the ball cup and the closure cap.

According to one embodiment of the invention, the ring and the joint cup may be held in the joint socket by a threaded ring. According to another embodiment of the invention, the said ring may be held by a flange of the joint socket. The said ring, which may have any desired cross-section, is advantageously arranged in the center portion of the teeth pertaining to the closure cap and the ball cup, respectively. The said ring may be composed of a plurality of parts and may act in the manner of a spring ring.

Figure 1:
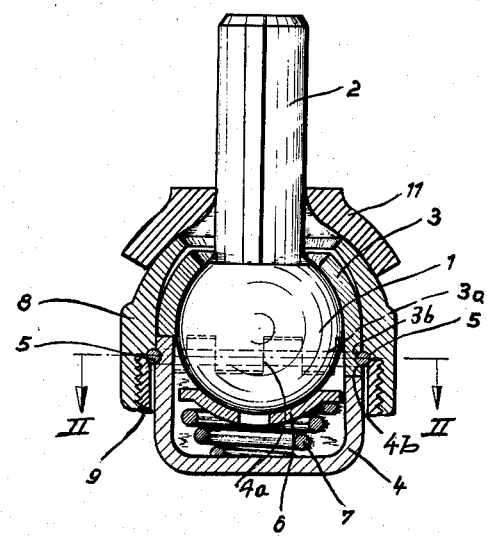
Fig. 1 represents a longitudinal section through a portion of a ball joint according to the invention.
Figure 2:
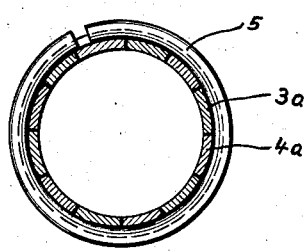
Fig. 2 is a cross-section taken along the line II—II of Fig. 1.

Referring now to the drawings in detail, and Figs. 1 and 2 thereof in particular, the ball head 1 of the ball stud 2 is arranged inside a ball cup 3. This ball cup is provided with individual teeth 3a which engage corresponding tooth spaces of the teeth 4a pertaining to the cover cap 4. In this way the ball cup 3 is connected with the cover or closure cap 4 in such a way that a rotative displacement of the parts relative to each other will not be possible. Approximately in the central portion of the teeth 3a and 4a at the outer circumference thereof there is provided a groove 3b and 4b in which is inserted a ring 5 holding together the two parts 3 and 4. Within the closure cap 4 there is mounted, in a manner known per se, a ball cup 6 which is under the load of a spring 7. If desired, as additional safety means, with an effect similar to that of ring 5, an additional ring may be arranged within the joint cup formed by the ball cup 3 and the closure cap 4.

Figure 1A:
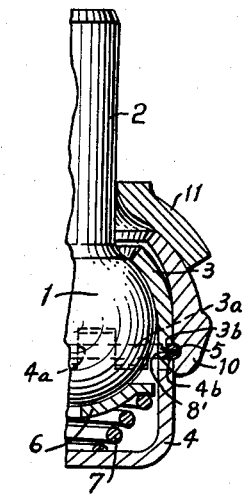
Fig. 1a is a longitudinal section through a portion of a ball joint according to the invention slightly modified over that of Fig. 1

The joint cup is inserted into the joint eye or socket 8. For securing said joint cup, a threaded ring 9 may be employed, as shown in Fig. 1, which threadedly engages the socket 8 and rests against the ring 5. Instead of the threaded ring 9, it is also possible, in conformity with the showing in Fig. 1a, to provide the socket 8 with a flange 10 resting against and forming an internal circumferential depression or groove 8' for ring 5. When installing the joint, in a manner known per se, the opening through which the ball stud 2 extends is sealed by a rubber sleeve 11.

Figure 3:
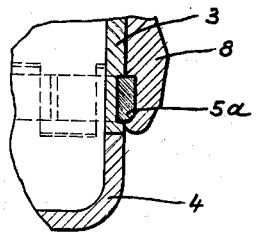
Fig. 3 illustrates a slight modification over the arrangement shown in Fig. 1.

Referring now to Fig. 3, the arrangement shown therein differs from the corresponding part in Fig. 1 merely in that the ring 5 has been replaced by a flat wire 5a of substantially rectangular cross-section. Also, in this instance, ring 5a is arranged approximately in the center portion of the teeth respectively pertaining to the ball cup and the closure cap.

Figure 4:
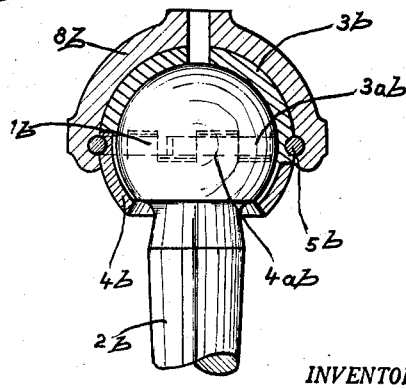

The modification illustrated in Fig. 4 represents a ball joint according to the invention with the ball stud 2b extending downwardly. As will be evident from a comparison of the arrangement of Fig. 4 with that of Fig. 1, the ball cup 6 and spring 7 of Fig. 1 are not necessary, and the closure cap 4b is directly adjacent the ball head 1b. The other elements of Fig. 4 substantially correspond to those of Fig. 1 and have been designated with the same numerals as in Fig. 1, however with the affix "b."

It is, of course, to be understood that the present invention is, by no means, limited to the particular construction shown in the drawing but also comprises any modifications within the scope of the appended claims. Thus, if desired, in the longitudinal direction of the joint, a plurality of rings 5, 5a, 5b spaced or not spaced from each other, may be provided. Furthermore, the said ring or rings may be composed of annular segments and may be resilient.

What I claim is:

1. In a ball joint, especially for the steering system of motor vehicles, a ball head having a stud connected thereto, a socket partially surrounding said ball head, and a joint cup enclosing said ball head and seated in said socket, said joint cup comprising a ball cup slidably seating said ball head and a closure cap completing said joint cup, said ball cup and cap having wall portions provided with interfitting complementary lugs, said lugs having alined external grooves to form a circumferential groove in said joint cup, and ring means seated in said circumferential groove and within said socket, said socket having an abutment engaging said ring to retain said joint cup seated in said socket.

2. A ball joint according to claim 1, in which said abutment means is threaded into said socket member.

3. A ball joint according to claim 1, in which said ring means is composed of segments.

4. A ball joint according to claim 1, in which said ring means is resilient.

5. In a ball joint, especially for the steering system of motor vehicles, a ball head having a stud connected thereto, a socket partially surrounding said ball head, and a joint cup enclosing said ball head and seated in said socket, said joint cup comprising a ball cup slidably seating said ball head and a closure cap completing said joint cup, said ball cup and cap having wall portions provided with interfitting complementary lugs, said lugs having alined external grooves to form a circumferential groove in said joint cup, said socket member having an internal circumferential depression opposed to said circumferential groove, and ring means seated in said circumferential groove and in said circumferential depression, said ring means connecting said interfitting lugs to maintain said joint cup assembled, and said socket member having abutment means engaging said ring means to secure said joint cup seated in said socket member.

6. A ball joint according to claim 5, in which the circumferential depression and abutment means in the socket member form a groove, and in which said last mentioned groove and the circumferential groove in the joint cup together substantially completely enclose said ring means.

References Cited in the file of this patent

UNITED STATES PATENTS

| | | |
|---|---|---|
| 1,355,793 | Bernay | Oct. 12, 1920 |
| 2,296,124 | Tampier | Sept. 15, 1942 |